(12) United States Patent
Tanimoto

(10) Patent No.: US 7,755,806 B2
(45) Date of Patent: Jul. 13, 2010

(54) IMAGE COMMUNICATION DEVICE

(75) Inventor: Yoshifumi Tanimoto, Hirakata (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 1388 days.

(21) Appl. No.: 11/175,295

(22) Filed: Jul. 7, 2005

(65) Prior Publication Data
US 2006/0007484 A1  Jan. 12, 2006

(30) Foreign Application Priority Data
Jul. 8, 2004  (JP)  ............. 2004-201550

(51) Int. Cl.
*H04N 1/40* (2006.01)
*H04N 1/00* (2006.01)

(52) U.S. Cl. .................. 358/462; 358/400
(58) Field of Classification Search ............. 358/1.15, 358/462, 1.1, 1.13, 1.14, 500, 400, 409, 407, 358/426.02
See application file for complete search history.

(56) References Cited

U.S. PATENT DOCUMENTS

| 6,195,177 | B1 * | 2/2001 | Marechal ............... 358/434 |
| 7,072,062 | B2 * | 7/2006 | Eguchi ................. 358/1.15 |
| 2004/0184110 | A1 * | 9/2004 | Maei et al. ............. 358/400 |
| 2006/0121919 | A1 * | 6/2006 | Amishima et al. ........ 455/466 |

FOREIGN PATENT DOCUMENTS

| JP | 2002-101256 | 4/2002 |
| JP | 2002-297544 | 10/2002 |

\* cited by examiner

*Primary Examiner*—Douglas Q Tran
(74) *Attorney, Agent, or Firm*—Westerman, Hattori, Daniels & Adrian, LLP

(57) ABSTRACT

An image communication device which transmits and receives image data through an IP network by using a call control protocol, and in particular, a facsimile machine which prevents a wrongful reception of the image data by spoofing by transmitting the image data after confirming that a connected destination is a true destination. Before establishing a media session by the SIP and transmitting image data, an image communication device of a transmitter transmits prescribed first text data to an image communication device of a recipient by the SIP method and receives text data from the image communication device of the recipient. When the received text data is prescribed second text data, the image communication device of the transmitter transmits the image data to the image communication device of the recipient.

6 Claims, 12 Drawing Sheets

| DESTINATION IP TELEPHONE NUMBER | TEXT DATA |
|---|---|
| 050-123-4567 | MESSAGE A, MESSAGE B |
| 050-000-9999 | MESSAGE C, MESSAGE D |
| 050-999-8888 | MESSAGE E |
| 050-987-6543 | MESSAGE F |

| DOCUMENT TYPE | TEXT DATA |
|---|---|
| ESTIMATION SHEET | MESSAGE G |
| GREETING | MESSAGE H |
| AGREEMENT | MESSAGE I |
| TECHNICAL LITERATURE | MESSAGE J |

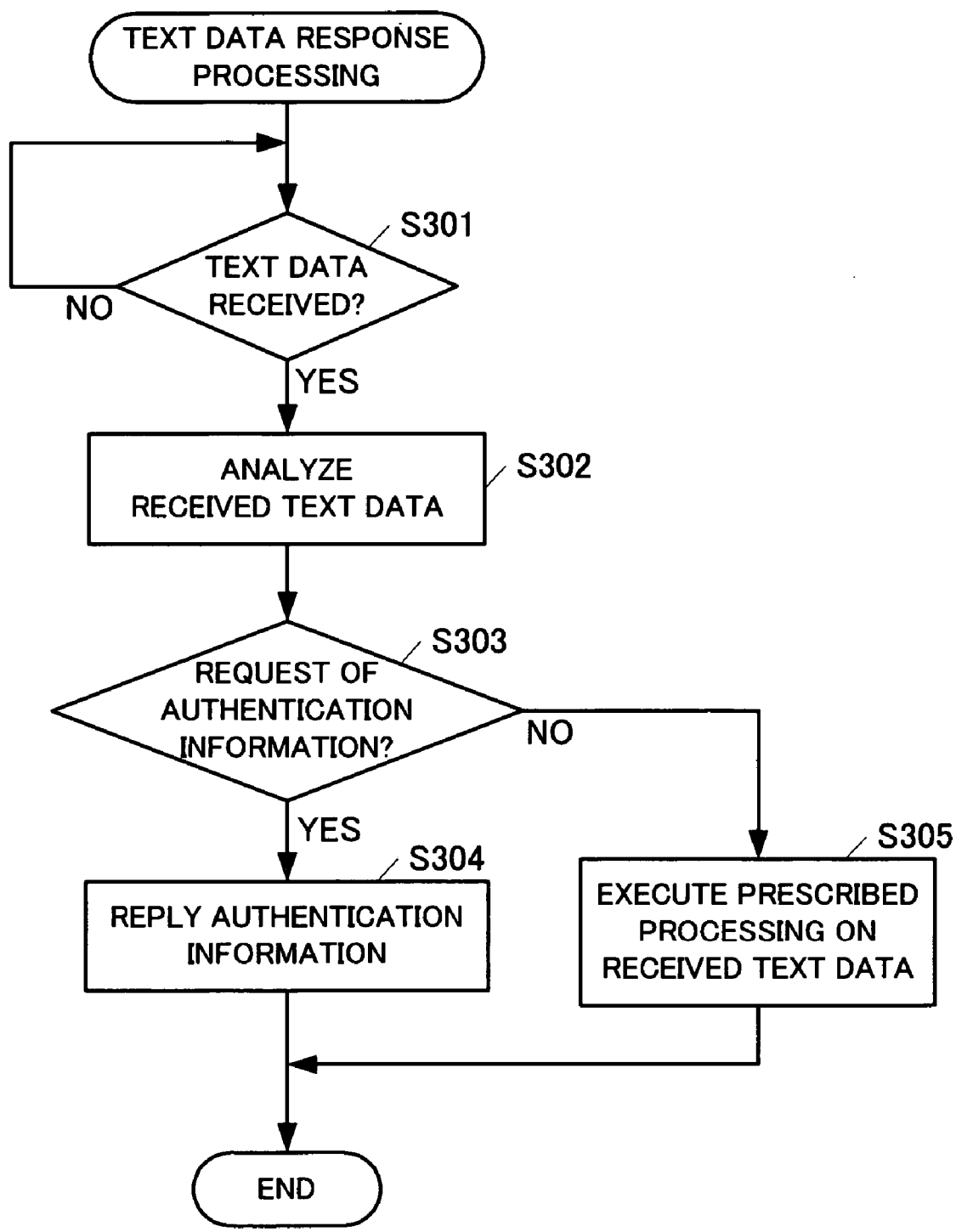

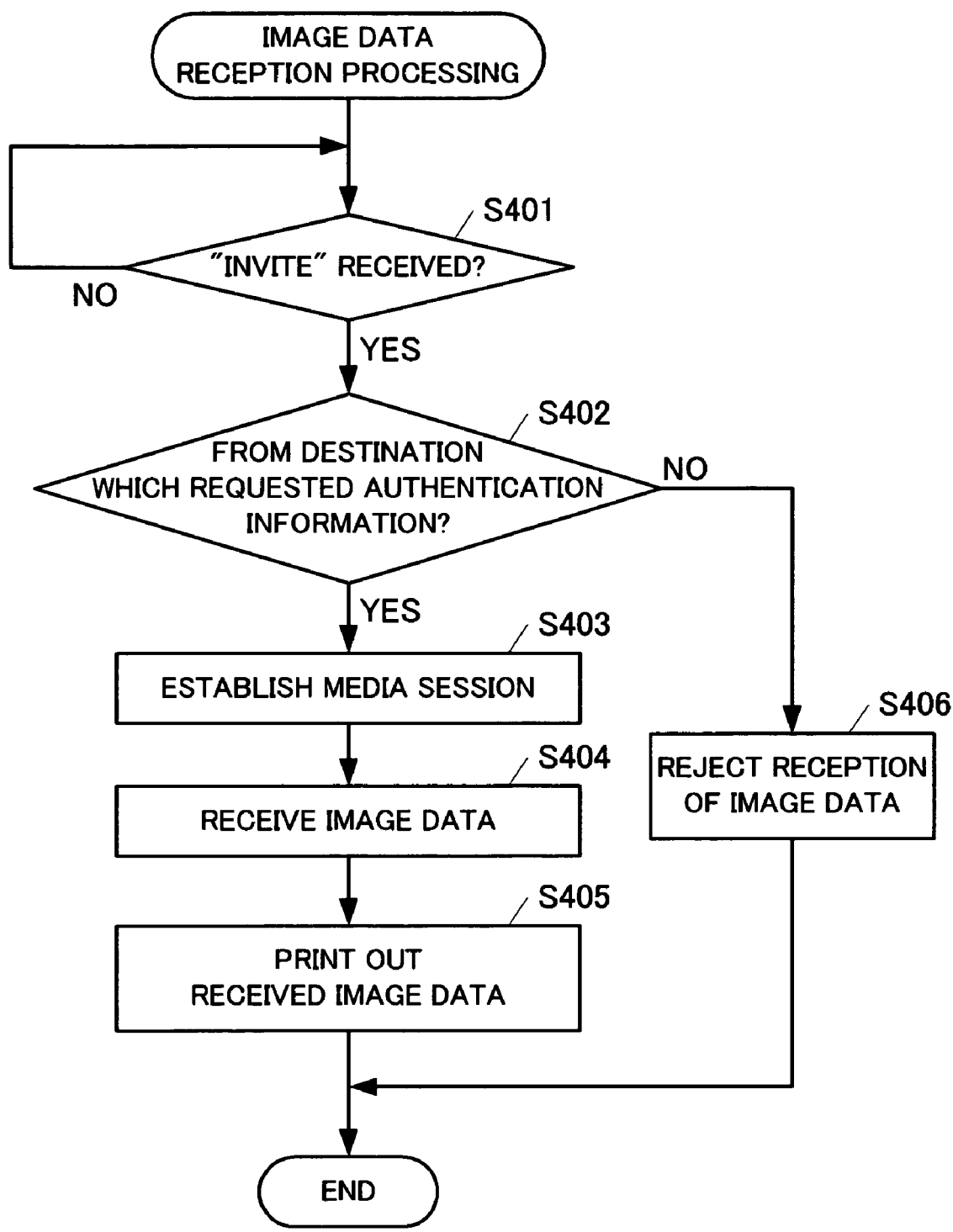

IMAGE COMMUNICATION DEVICE

BACKGROUND OF THE INVENTION

1. Field of the Invention

The present invention relates to an image communication device which transmits and receives image data and text data by using a call control protocol such as the Session Initiation Protocol (SIP).

2. Description of Related Art

Recently, communication devices, which carry out various data communications through an Internet Protocol (IP) network such as an IP telephone communication and an electronic mail communication, are becoming widespread. A proposal is made on a facsimile machine, which carries out a data communication for both voice data and image data. For example, a conventional facsimile machine includes an IP telephone communication function and an IP facsimile communication function based on the International Telecommunication Union-Telecommunications (ITU-T) recommendation T.38 and is capable of carrying out transmission and reception by an IP telephone communication and an IP facsimile communication at the same time. By transmitting image data of an original document by using the IP facsimile communication in place of a G3 facsimile communication, a voice communication can be carried out with a destination while transmitting the image data and the communication costs can be reduced.

However, since facsimile data transmitted to a destination through the IP network reaches the destination via many networks, there are fears that the facsimile data may be intercepted wrongfully by a communication device spoofing the true destination. Therefore, when the content of a transmission original document is a confidential document or the like which should not be learnt by a third party, even if a high communication cost is required, the G3 facsimile communication or the like, which transmits image data through a Public Switched Telephone Network (PSTN), had to be used.

SUMMARY OF THE INVENTION

The present invention has been made in consideration of the above-described circumstances. An advantage of the present invention is to provide a facsimile machine which transmits and receives image data through an IP network by using a call control protocol, and in particular, a facsimile machine which prevents a wrongful reception of the image data by spoofing by transmitting the image data after confirming that a connected destination is a true destination.

According to an aspect of the present invention, before establishing a media session by a call control protocol and transmitting image data, the facsimile machine transmits prescribed first text data to a destination by a method of the call control protocol and receives text data transmitted from the destination. Only when the received text data is prescribed second text data, the facsimile machine transmits the image data to the destination.

According to another aspect of the present invention, before establishing a media session by a call control protocol and transmitting image data, the facsimile machine transmits prescribed encrypted first text data to a destination by a method of the call control protocol and receives text data transmitted from the destination. When response text data for the first text data and an electronic signature of the response text data are included in the received text data, the facsimile machine decrypts the electronic signature by using a public key and verifies with the response text data to determine whether or not the destination is a true destination. Only when the facsimile machine determines that the destination is a true destination, the facsimile machine transmits the image data to the destination.

According to another aspect of the present invention, the facsimile machine receives text data by a method of a call control protocol. When the received text data is prescribed first text data, the facsimile machine transmits prescribed second text data to a transmitter of the prescribed first text data by the method of the call control protocol. Only when image data is transmitted from the transmitter of the prescribed first text data, the facsimile machine establishes a media session by the call control protocol and receives the image data.

BRIEF DESCRIPTION OF THE SEVERAL VIEWS OF THE DRAWINGS

FIG. 2 shows an example of a table which registers a destination IP telephone number (destination information) and text data by associating with one another.

FIG. 3 shows an example of a table which registers a document type and text data by associating with one another.

FIG. 11 is a flowchart showing a processing operation executed by a called facsimile machine when receiving text data according to the second embodiment of the present invention.

FIG. 12 is a flowchart showing a processing operation executed by a called facsimile machine when receiving image data according to the second embodiment of the present invention.

DETAILED DESCRIPTION OF THE INVENTION

First Embodiment

As an image communication device according to a first embodiment of the present invention, a description will be made of an example of a Multi Function Peripheral (MFP)

facsimile machine having an IP facsimile communication function for transmitting image data of an original document by using a call control protocol and a G3 facsimile communication function, and a facsimile server function for carrying out various facsimile communications according to a request from a client device, or the like.

Figure 1:
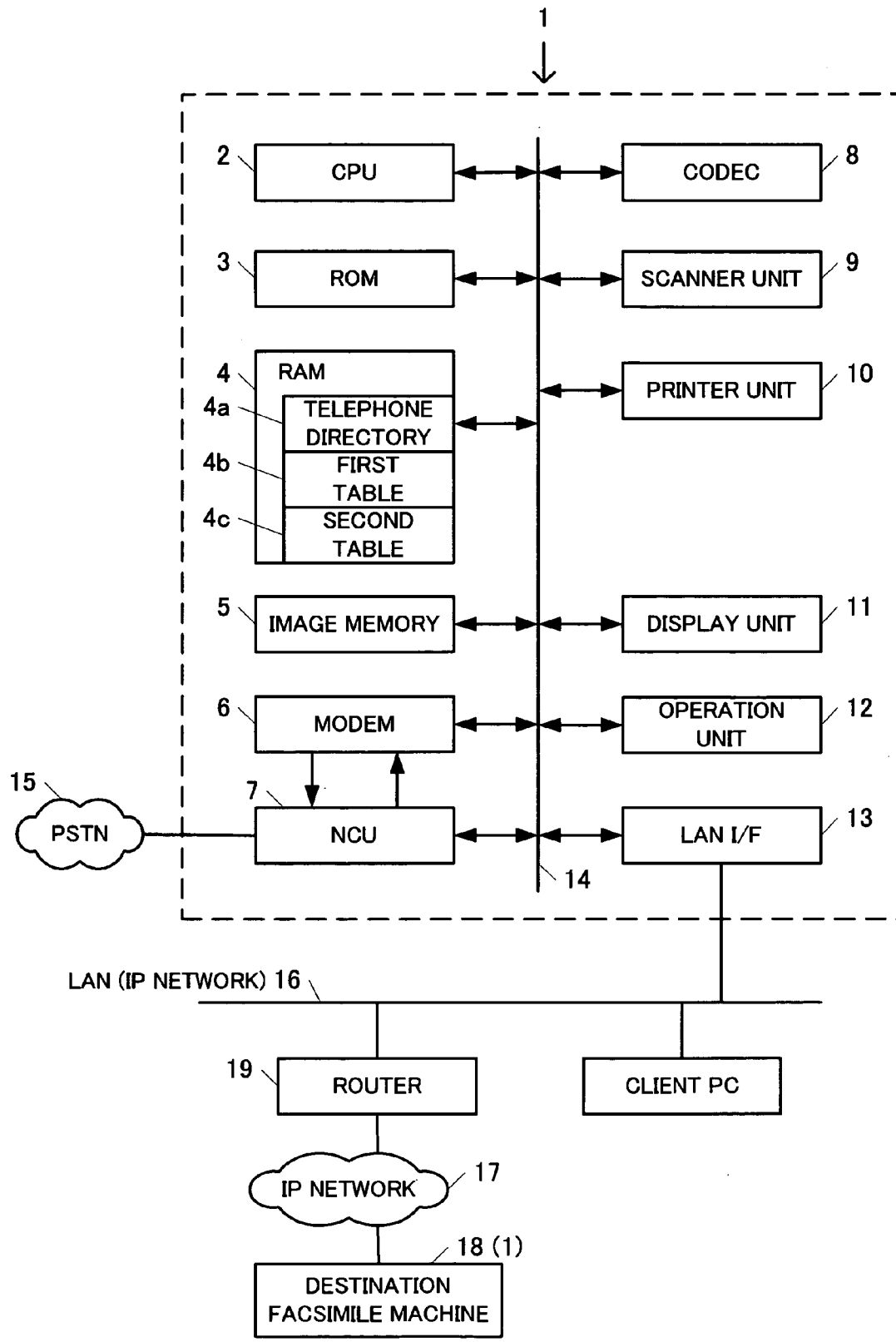
FIG. 1 shows an example of a configuration of a facsimile machine according to a first embodiment of the present invention.

FIG. 1 shows an example of a configuration of a facsimile machine 1. The facsimile machine 1 includes a Central Processing unit (CPU) 2, a Read Only Memory (ROM) 3, a Random Access Memory (RAM) 4, an image memory 5, a modem 6, a Network Control Unit (NCU) 7, a codec 8, a scanner unit 9, a printer unit 10, a display unit 11, an operation unit 12 and a Local Area Network (LAN) interface 13. Each of the units 2 through 13 is connected via a bus 14.

The CPU 2 functions as a control unit which controls each of the units of the facsimile machine 1 in accordance with a control program stored in the ROM 3. The RAM 4 functions as a main memory and a working area or the like of the CPU 2. The RAM 4 stores a telephone directory 4a, which stores a destination facsimile number, a destination IP telephone number or the like associated with a speed dial number or a one-touch dial key. Furthermore, in the RAM 4, text data is registered by being associated with destination IP telephone number (destination information) or a type of a transmission original document (a type of transmission image data). For example, a first table 4b, which registers (stores) text data for each destination IP telephone number as shown in FIG. 2, and a second table 4c, which registers (stores) text data for each type of a transmission original document as shown in FIG. 3, are formed in the RAM 4. Further, "MESSAGE A", "MESSAGE B", etc. shown in a "TEXT DATA" column of the first table 4b and the second table 4c represent text data registered arbitrarily by a user.

The image memory 5 stores image data or the like compressed and encoded by the codec 8. The modem 6 modulates and demodulates transmission data and received data in accordance with, for example, the ITU-T recommendation V.34 standard or anything similar to this. The NCU 7 is a network control device, which carries out a closing operation and a releasing operation of a communication line with a PSTN 15. Then NCU 7 connects the modem 6 to the PSTN 15 at G3 facsimile transmission and reception. When carrying out a facsimile transmission or the like, the codec 8 compresses and encodes image data by the Joint Photographic Experts Group (JPEG) method or the Modified Huffman (MH), the Modified Read (MR) or the Modified Modified Read (MMR) method or the like. The codec 8 decodes received image data or the like.

The scanner unit 9 scans image data of an original document. For example, the scanner unit 9 includes a Charge Coupled Device (CCD) color line sensor, an Analog-to-Digital (A/D) converter and an image processing circuit or the like. The printer unit 10 picks up printing paper from a paper feed cassette and prints received image data, scanned image data or the like onto the printing paper. The display unit 11 is, for example, a Liquid Crystal Display (LCD) provided in proximity to the operation unit 12. The display unit 11 displays various pieces of screen information. The operation unit 12 includes various operation keys such as a start key, a character entry key and a function key. The user carries out various operations from the operation unit 12.

The LAN interface 13 is an interface for establishing a connection between the facsimile machine 1 and a LAN 16. The facsimile machine 1 carries out communication through the LAN 16 with a client Personal Computer (PC), a router 19 or the like, which are also connected to the LAN 16. The facsimile machine 1 also carries out IP facsimile communication using the SIP through the router 19 with a facsimile machine 18, which is provided on an IP network 17 and is similar to the facsimile machine 1.

The above-described facsimile machine 1 is embedded with the Transmission Control Protocol/Internet Protocol (TCP/IP), the SIP, the Real-time Transport Protocol (RTP), the Session Description Protocol (SDP) or the like. The facsimile machine 1 establishes a media session by the SIP and, for example, transmits and receives image data of an original document to and from a destination by the RTP. The facsimile machine 1 also includes a function for transmitting and receiving text data to and from a destination by using a SIP method "MESSAGE". The communication protocol for transmitting and receiving image data is not limited to the RTP. Instead of the RTP, the Simple Mail Transfer Protocol (SMTP), the Hyper Text Transfer Protocol (HTTP) or the like can be used for the communication protocol.

Figure 4:
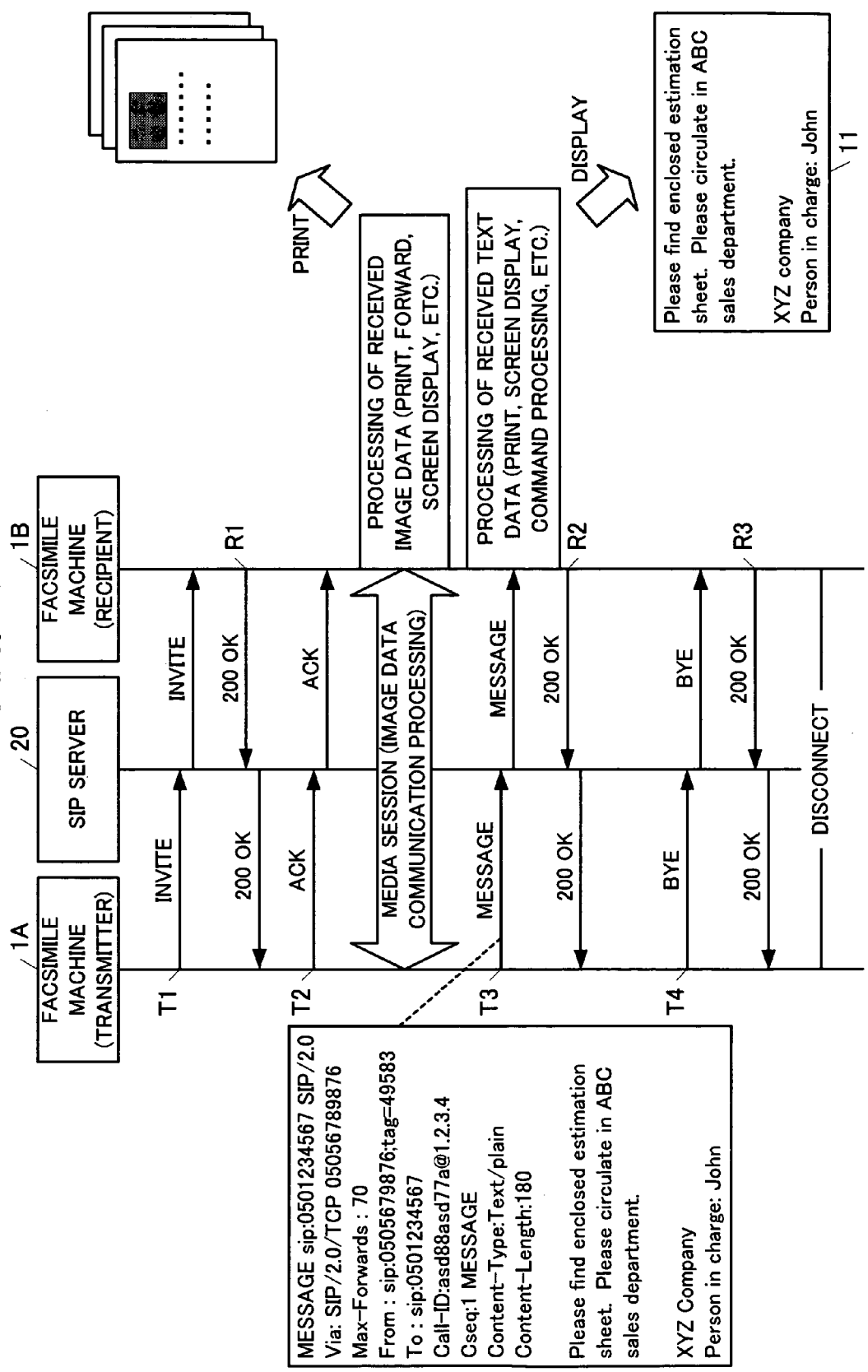
FIG. 4 is a sequence diagram showing an outline of an example of a communication procedure formed by facsimile machines when executing an IP facsimile communication according to the first embodiment of the present invention.
Figure 5:
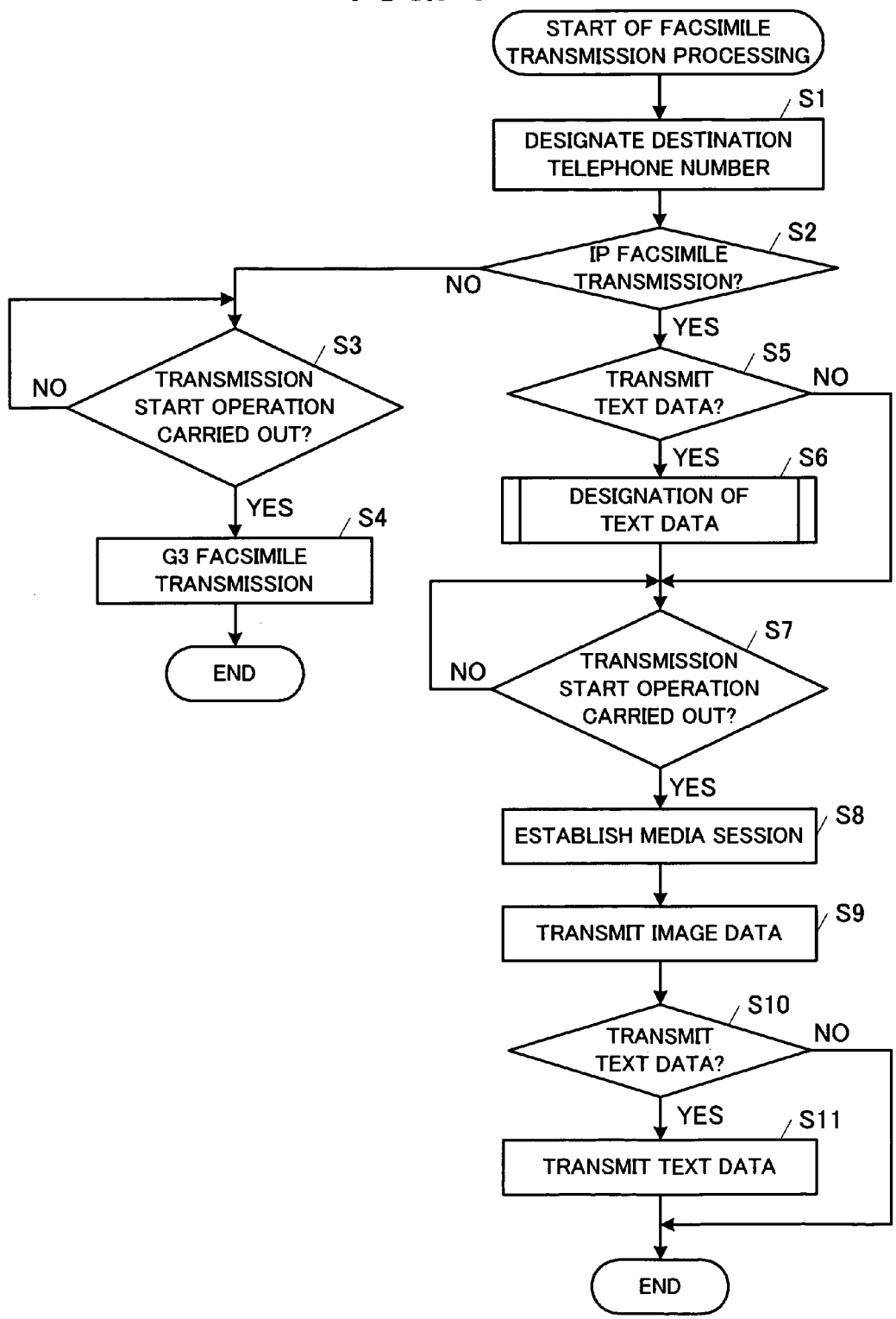
FIG. 5 is a flowchart showing a processing operation executed by a facsimile machine when carrying out an IP facsimile transmission or a G3 facsimile transmission according to the first embodiment of the present invention.
Figure 6:
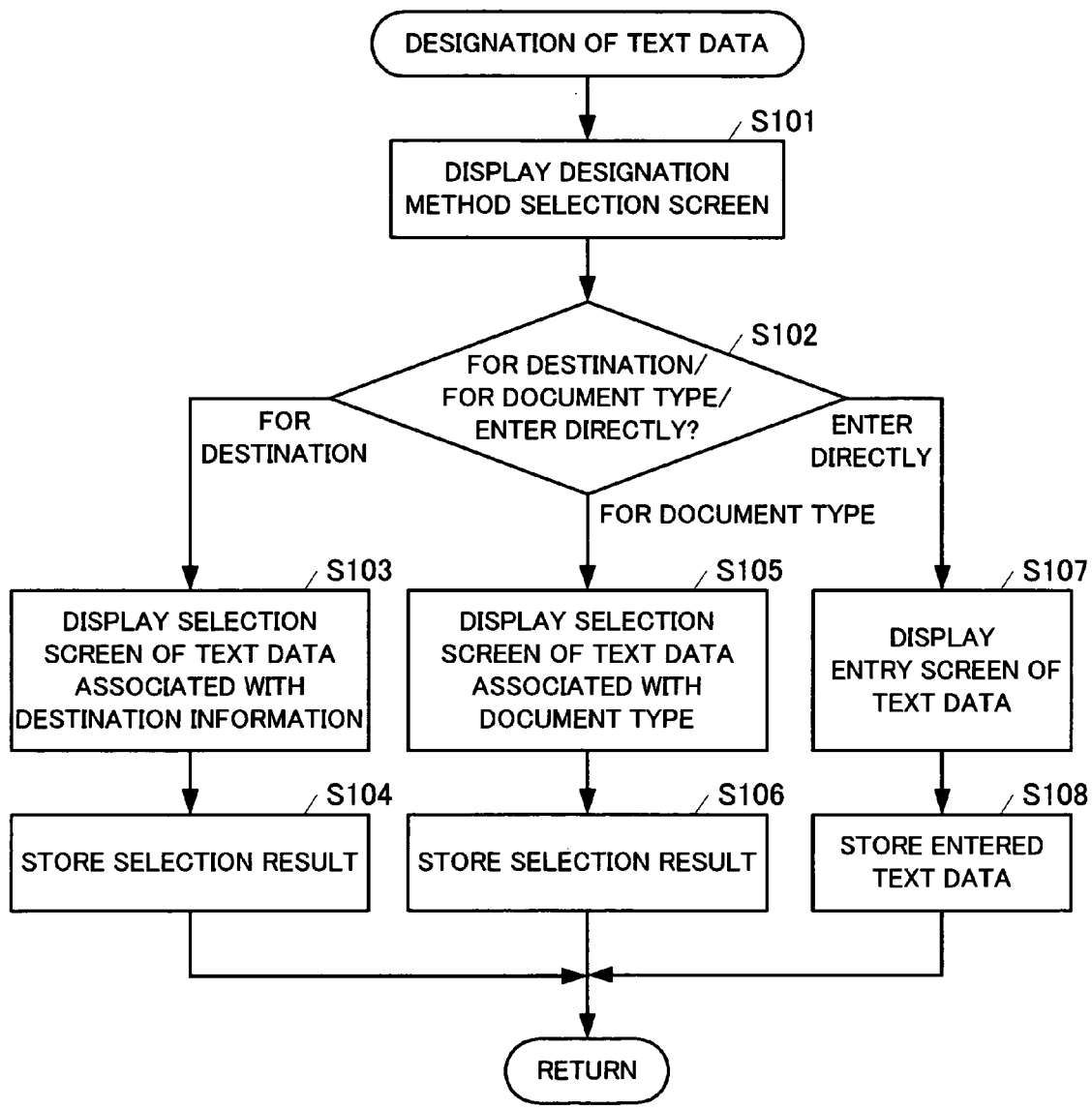
FIG. 6 is a flowchart showing a processing operation of a caller facsimile machine executed when a designation of text data is carried out.

Next, referring to the sequence diagram shown in FIG. 4 and the flowcharts shown in FIG. 5 and FIG. 6, a detailed description will be made of a processing operation when the facsimile machine 1 having the above-described configuration and communication function transmits image data and text data by the IP facsimile communication to a facsimile machine having the same configuration and the same communication function as the facsimile machine 1. Further, each processing operation of the facsimile machine 1 to be described with reference to these drawings is executed by following a command generated by the CPU 2, which is a control unit, in accordance with a control program stored in the ROM 3. In the following, for convenience of the description, the facsimile machine 1 to be a caller side will be referred to as a transmitter 1A and the facsimile machine 1 to be a called side will be referred to as a recipient 1B.

First, referring to the sequence diagram of FIG. 4, a description will be made of a communication procedure when image data and text data are transmitted and received between the transmitter 1A and the recipient 1B by the IP facsimile communication. When a transmission operation is carried out at the transmitter 1A, a call control session for establishing a media session as shown in the drawing is formed between the transmitter 1A and the recipient 1B. That is, the transmitter 1A requests a SIP server 20, a call of the recipient 1B by a session participation request "INVITE", which designates an IP telephone number of the recipient 1B (T1). The SIP server 20, which received "INVITE", inquires a location server (not shown), which has information that associates an IP telephone number and an IP address, as to an IP address associated with the IP telephone number designated by the transmitter 1A. Then, the SIP server 20 carries out a call by transmitting "INVITE" received from the transmitter 1A to the acquired IP address of the recipient 1B. When the recipient 1B responds to the call from the SIP server 20, the recipient 1B receives "INVITE" and transmits a success response code "200 OK" to the SIP server 20 (R1). The transmitter 1A, which received the success response code "200 OK", transmits information "ACK" indicating the reception of the success response code "200 OK" via the SIP server 20 to the recipient 1B (T2). Then, a media session is established between the transmitter 1A and the recipient 1B and image data is transmitted from the transmitter 1A to the recipient 1B.

While the media session is established, the text data designated by the user (a designation of the text data will be described later) is transmitted to the recipient 1B by the SIP method "MESSAGE" under a timing independent from the transmission processing of the image data in the media session (T3). That is, the text data designated by the user is transmitted to the recipient 1B by the SIP method "MES- SAGE" at the same time as the transmission processing of the image data or before or after the transmission processing of the image data. Further, if the SIP method can transmit any designated text data to a destination, the SIP method is not limited to the above-described example and another method can be used.

The recipient 1B executes a prescribed processing on each of the image data and the text data received from the transmitter 1A, respectively. For the received image data, for example, the recipient 1B executes a print processing, a forward processing, a screen display processing or the like. For the received text data, for example, the recipient 1B executes a print processing, a screen display processing or the like. Moreover, the recipient 1B can previously store text data and a specific processing operation by associating with one another and execute a corresponding processing operation by regarding the received text data as a command.

When the transmission processing of the image data and the text data from the transmitter 1A to the recipient 1B is completed, the transmitter 1A transmits "BYE" requesting an end of the session via the SIP server 20 to the recipient 1B (T4). The recipient 1B transmits a success response code "200 OK" via the SIP server 20 to the transmitter 1A (R3). Then, the communication is disconnected.

Next, referring to the flowcharts shown in FIG. 5 and FIG. 6, the above-described processing operation of the transmitter 1A will be described in more detail.

At the transmitter 1A, a destination telephone number (destination information) is designated by being entered directly or is designated by using a speed dial function or a one-touch dial function (S1). Then, the transmitter 1A determines whether to carry out the IP facsimile transmission or whether to carry out the G3 facsimile transmission in accordance with the designated destination telephone number (S2). The determination is carried out, for example, in accordance with a specific digit of the telephone number.

When a determination is made to carry out the G3 facsimile transmission (S2: NO), after a transmission start operation is carried out (for example, after the start key is pressed) (S3: YES), the transmitter 1A transmits the image data of the original document to a destination device having the designated telephone number by the G3 facsimile communication (S4).

When a determination is made to carry out the IP facsimile transmission (S2: YES), the transmitter 1A executes a processing operation for requesting the user as to an instruction of whether or not to transmit the text data. For example, the transmitter 1A displays an inquiry such as "Transmit text data?" and accepts a positive/negative instruction operation for the inquiry display (for example, an entry of Y/N from the operation unit 12). When a positive instruction operation is carried out and a determination is made to transmit the text data (S5: YES), the text data is designated by a prescribed operation of the user (S6).

Figure 7:
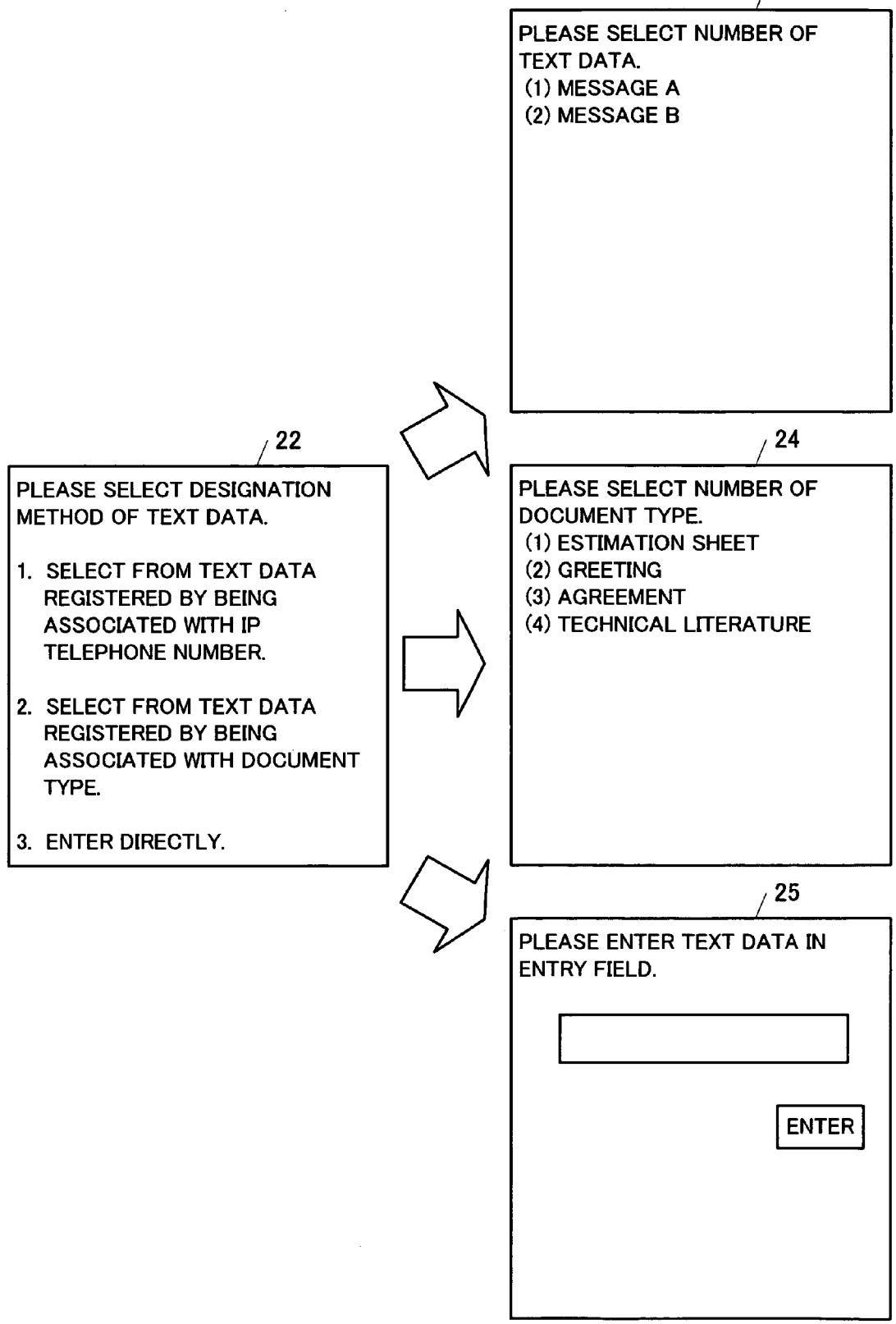
FIG. 7 shows a specific example of display screens displayed at the caller facsimile machine when the designation of the text data is carried out.

The designation of the text data by the user is carried out by selecting from the text data registered in the first table 4b by being associated with the IP telephone number designated at S1, selecting from the text data registered in the second table 4c by being associated with a type of the original document or by directly entering a character or the like by the user. More specifically, after the transmitter 1A makes a positive determination at S5, the transmitter 1A displays on the display unit 11, a screen 22 for selecting a designation method of the text data as shown in FIG. 7 (S101). The screen 22 displays selectable items such as "Select from text data registered by being associated with IP telephone number.", " " Select from text data registered by being associated with document type." and "Enter directly." When either one of the items is selected by a prescribed operation, a corresponding screen 23, 24 or 25 is displayed on the display unit 11.

When the item displayed as "Select from text data registered by being associated with IP telephone number." is selected (S102: for destination), the display unit 11 displays the text data selection screen 23, which displays the text data stored in the first table 4b by being associated with the IP telephone number designated at S1 in a manner that the text data can be selected (S103). When either one of the text data displayed on the text data selection screen 23 is selected by a prescribed operation, the selection result is stored in the RAM 4 until the text data is transmitted later (S104).

When the item displayed as "Select from text data registered by being associated with document type." is selected (S102: for document type), the display unit 11 displays the document type selection screen 24, which displays document types registered in the second table 4c in a manner that a document type can be selected (S105). When either one of the document types displayed on the document type selection screen 24 is selected by a prescribed operation, the selection result is stored in the RAM 4 until the text data is transmitted later (S106).

When the item displayed as "Enter directly." is selected (S102: enter directly), for example, the display unit 11 displays the text data entry screen 25 as shown in the drawing (S107). When the text data is entered directly by a key operation or the like of the operation unit 12, the entered text data is stored until the text data is transmitted later (S108).

After the processing operation of S6 is executed or after a negative determination is made at S5, when a transmission start operation is carried out (for example, when the start key is pressed) (S7), the transmitter 1A forms the call control session of T1, T2 or the like with the recipient 1B and establishes a media session (S8). Then, the transmitter 1A carries out a transmission processing of the image data of the original document (S9). The image data of the original document to be transmitted is, for example, image data of an original document scanned by the scanner unit 9, image data received from the client PC along with a facsimile transmission command or image data accumulated previously in the facsimile machine 1.

When a positive determination is made at S5 (S10: YES), the designated text data to be transmitted is retrieved in accordance with the selection result or the entered text data stored at S104, S106 or S108. That is, when the processing operation of S104 is executed, the text data selected from the text data associated with the selected destination IP telephone number is transmitted to the recipient 1B by the SIP method "MESSAGE" as the designated text data (S1). When the processing operation of S106 is executed, the text data associated with the selected document type (the type of the image data) is transmitted to the recipient 1B by the SIP method "MESSAGE" as the designated text data (S11). When the processing operation of S108 is executed, the entered text data is transmitted to the recipient 1B by the SIP method "MESSAGE" as the designated text data (S11). Then, the transmitter 1A transmits "BYE" requesting an end of the session and disconnects the communication with the recipient 1B. Meanwhile, when a negative determination is made at S5 (S10: NO), the transmitter 1A transmits "BYE" without carrying out the processing operation of S11 and disconnects the communication (T4).

Further, in the present embodiment, after the transmission processing of the image data of S9 is carried out, the transmission processing of the text data of S11 is carried out. However, before carrying out the transmission processing of the image data of S9, the processing operations of S10 and S11 can be carried out to carry out the transmission processing of the text data. Alternatively, while carrying out the transmission processing of the image data of S9, the processing operations of S10 and S11 can be carried out to transmit the text data.

In the present embodiment, the text data is stored by being associated with the destination IP telephone number or the document type. However, a plurality of text data can be registered in a prescribed area of the RAM 4 in an independent form without being associated with other information, and at S6, a plurality of the registered text data can be displayed on the display unit 11 in a manner that text data can be selected, and at S11, the selected text data can be transmitted as the designated text data to be transmitted. This description also applies to a second embodiment to be described later.

Second Embodiment

Next, a description will be made of a facsimile machine according to the second embodiment of the present invention. Before establishing a media session by a call control protocol and transmitting image data of an original document, the facsimile machine of the second embodiment confirms whether or not a destination is a true destination and then transmits the image data of the original document. In the following, a description will be made mainly of a difference with respect to the facsimile machine 1 of the first embodiment. For the configuration and the processing operation that are the same as the facsimile machine 1 of the first embodiment, the same reference numeral will be applied in the drawing and the description will be omitted. For convenience of the description, also in the second embodiment, a facsimile machine 30 to be a caller side will be referred to as a transmitter 30A and a facsimile machine 30 to be a called side will be referred to as a recipient 30B.

Figure 8:
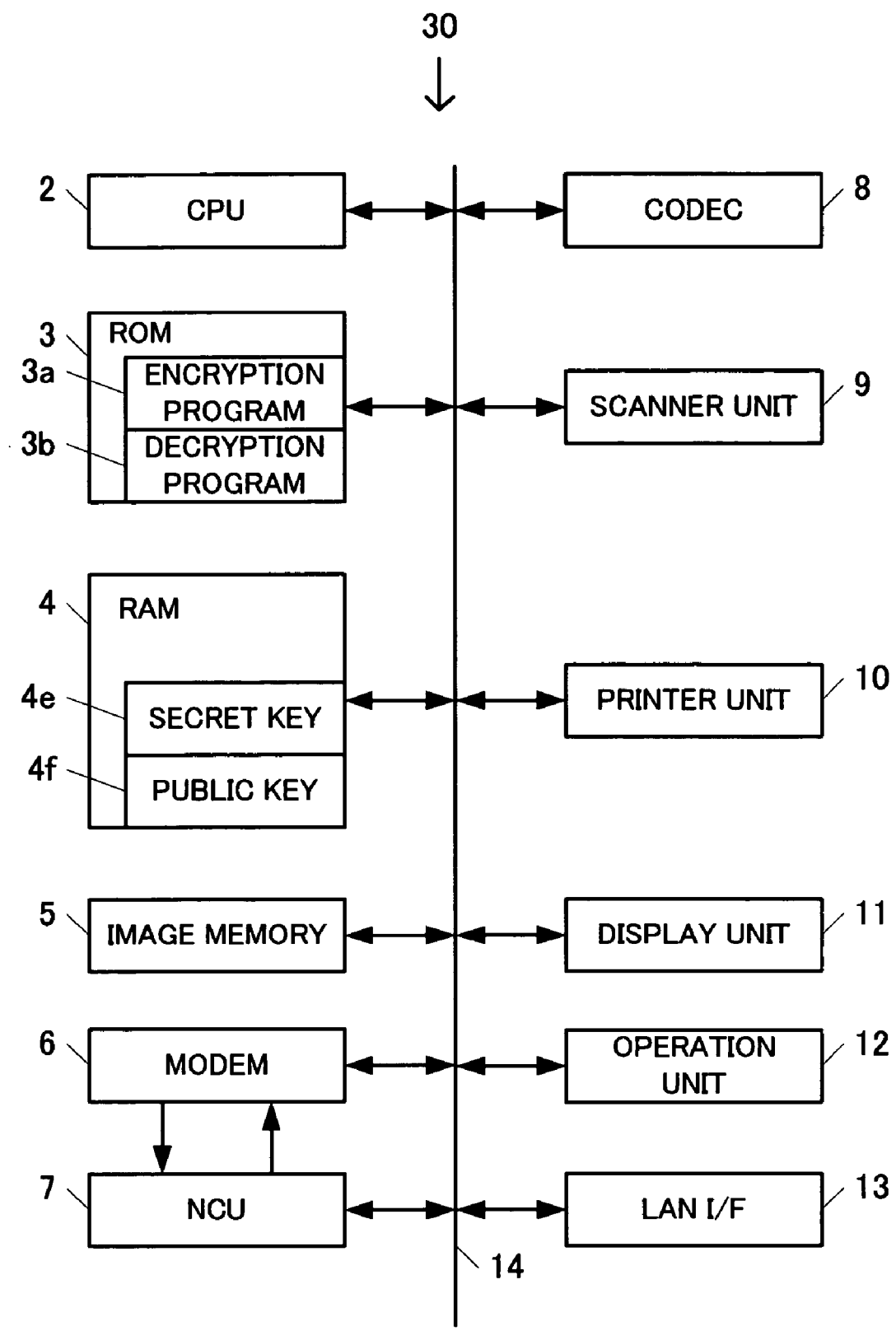
FIG. 8 shows an example of a configuration of a facsimile machine according to a second embodiment of the present invention.

First, a description will be made of an example of a configuration of the facsimile machine 30 according to the second embodiment of the present invention. As shown in FIG. 8, the facsimile machine 30 of the second embodiment basically has the same configuration as the facsimile machine 1 of the first embodiment. However, the facsimile machine 30 differs partially from the facsimile machine 1 regarding information stored in the ROM 3 and the RAM 4. That is, other than a control program (not shown) for executing a processing operation to be described later, the ROM 3 stores an encryption program 3a for creating an encrypted message and a decryption program 3b for decrypting the encrypted message. The RAM 4 stores a secret key 4e unique to each facsimile machine 30 and a public key 4f corresponding to the secret key 4e.

Figure 9:
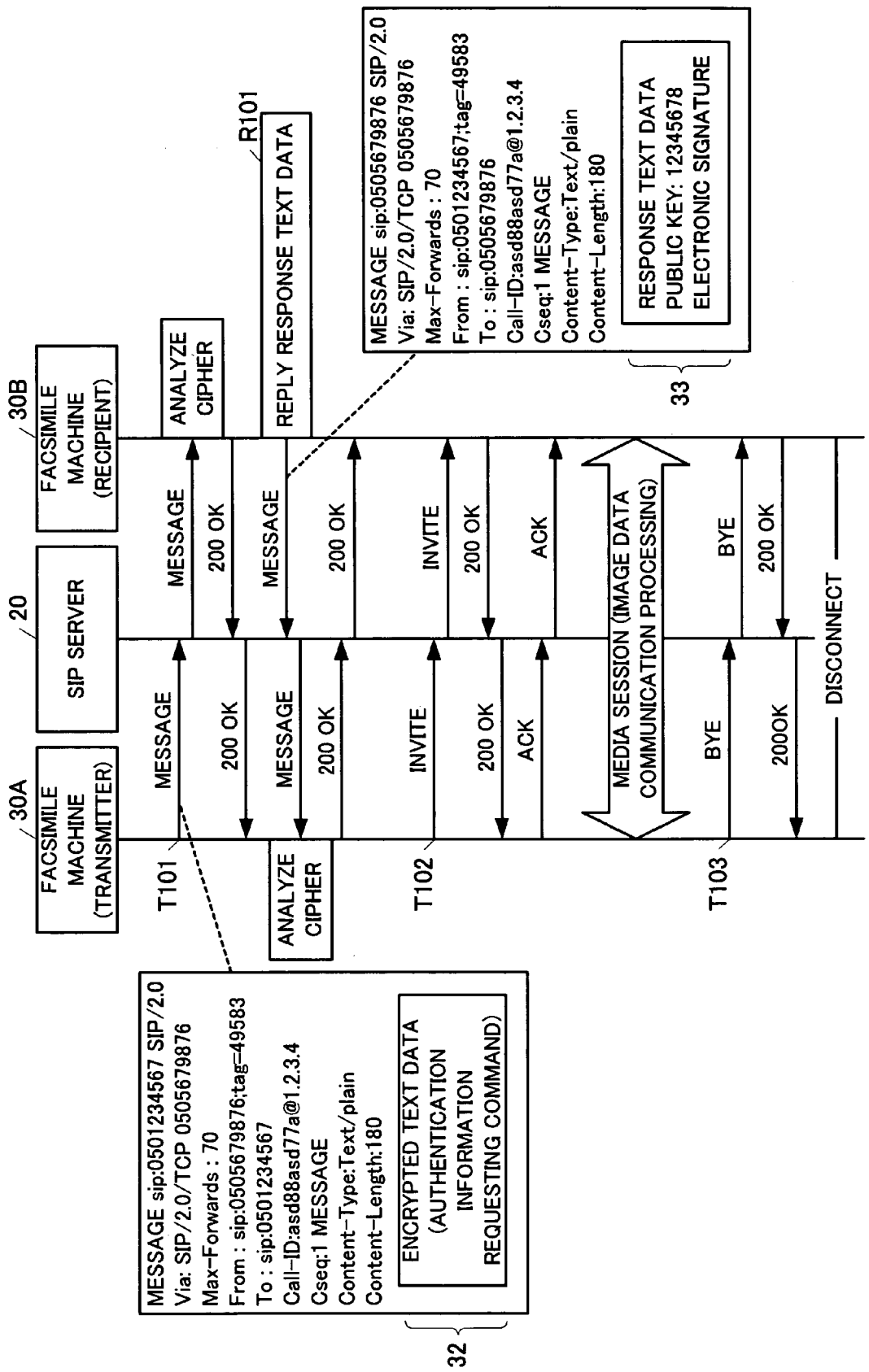
FIG. 9 is a sequence diagram showing an outline of an example of a communication procedure formed by facsimile machines when executing an IP facsimile communication according to the second embodiment of the present invention.
Figure 10:
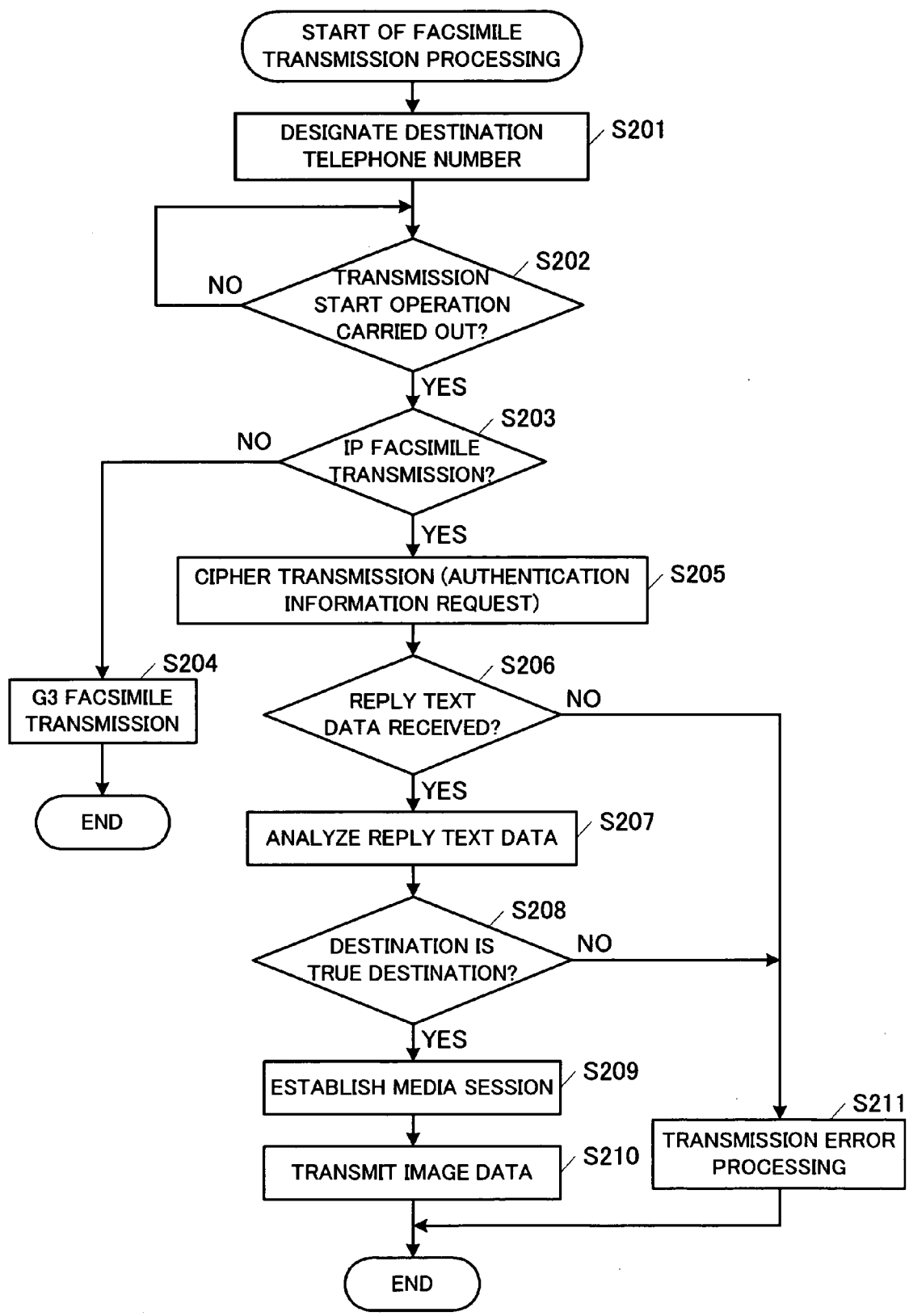
FIG. 10 is a flowchart showing a processing operation executed by a caller facsimile machine when transmitting image data of an original document by an IP facsimile according to the second embodiment of the present invention.

In the following, referring to the sequence diagram shown in FIG. 9 and the flowcharts shown in FIG. 10 and FIG. 12, a description will be made of a processing operation executed by each of the facsimile machines 30 when transmitting image data from the transmitter 30A to the recipient 30B. Further, also in the second embodiment, if the SIP method can transmit any designated text data to a destination, the SIP method for transmitting and receiving the text data is not limited to the "MESSAGE" and another method can be used.

At the transmitter 30A, when a destination telephone number (destination information) is designated by an operation of the user or the like (S201) and a transmission start operation is carried out (for example, when the start key is pressed) (S202: YES), a determination is made as to whether to carry out an IP facsimile transmission or whether to carry out a G3 facsimile transmission in accordance with the designated destination telephone number (S203). The determination is carried out in the same manner as S2. When the transmitter 30A determines to carry out a G3 facsimile transmission (S203: NO), the image data of the original document is transmitted to a destination device having the telephone number designated at S201 by the G3 facsimile communication (S204).

Meanwhile, when the transmitter 30A determines to carry out the IP facsimile transmission (S203: YES), before establishing a media session by the SIP and transmitting the image data of the original document, the transmitter 30A transmits prescribed first text data to the destination by the SIP method "MESSAGE" (S205, T101). As the first text data, an encrypted prescribed authentication information requesting command, which is encrypted by executing the encryption program 3a of the CPU 2, is transmitted.

Meanwhile, as shown in FIG. 11, when the recipient 30B receives text data by the SIP method "MESSAGE" (S301: YES), the recipient 30B analyzes the received text data (S302). Specifically, the recipient 30B determines whether or not the received text data is cipher. When the received text data is cipher, the recipient 30B decrypts the cipher of the text data by executing the decryption program 3b of the CPU 2 and analyzes the content of the decrypted information.

As a result of analyzing the received text data, when the recipient 30B determines that the received text data is a command requesting authentication information (S303: YES), the recipient 30B transmits prescribed second text data 33 by the SIP method "MESSAGE" (S304, R101). The second text data 33 includes prescribed response text data for the first text data (an authentication requesting command), an electronic signature encrypted from the response text data by the secret key 4e of the recipient 30B, and the public key 4f of the recipient 30B for decrypting the electronic signature. Further, the encryption processing by the recipient 30B is carried out by executing the encryption program 3a of the CPU 2 by using the secret key 4e (the unique secret key 4e held only by the recipient 30B).

At S303, when the recipient 30B determines that the received text data is not the authentication information requesting command (the prescribed first text data) (S303: NO), for example, when the received text data is simply text data and not encrypted data, the recipient 30B executes a processing on the received text data in accordance with an apparatus setting or the like of the recipient 30B. For example, the received text data is displayed on the display unit 11 or printed out onto printing paper by the printer unit 10 (S305)

After the transmitter 30A executes the transmission processing of the first text data at S205, when the transmitter 30A receives the text data by the SIP method "MESSAGE" (S206: YES), the transmitter 30A determines whether or not the received text data is reply text data returned as a response processing from the recipient 30B that received the first text data, in accordance with, for example, the IP telephone number or the like of the destination acquired along with the reception of "MESSAGE". When the transmitter 30A determines that the received text data is the reply text data (S206: YES), by determining whether or not the received text data is prescribed second text data, the transmitter 30A determines whether or not the recipient 30B is a true destination corresponding to the destination IP telephone number designated at S201 (S208).

To determine whether or not the received text data is second text data, first, the transmitter 30A executes the decryption program 3b of the CPU 2 and uses the public key 4f included in the text data received from the recipient 30B to decrypt the electronic signature included in the received text data. Then, the transmitter 30A verifies the decrypted data and the response text data included in the received text data. Only when the decrypted data and the response text data correspond with one another, the transmitter 30A determines that the recipient 30B, which is the destination, is the true destination corresponding to the destination IP telephone number designated at S201. Further, in the present embodiment, a description is made based on a fact that the response text data, the electronic signature and the public key 4f are included as the second text data. However, the second text data may include only the response text data and the electronic signature. That is, when the transmitter 30A receives the text data including the response text data and the electronic signature from the recipient 30B, the transmitter 30A decrypts the electronic signature included in the received text data by using the public key 4f of the recipient 30B, which is obtained through a route different from the received text data or which is stored previously. Only when the decrypted electronic signature corresponds with the response text data included in the received text data, a determination can be made that the recipient 30B, which is the destination, is the true destination corresponding to the destination IP telephone number designated at S201.

When the transmitter 30A determines that the recipient 30B is the true destination corresponding to the destination IP telephone number designated at S201 (S208: YES), the transmitter 30A transmits "INVITE" to the recipient 30B (T101). Then, a media session is established via the procedure described in the first embodiment (S209) and the transmitter 30A transmits the image data of the original document (S210). After the transmission processing is completed, as described in the first embodiment, the transmitter 30A transmits "BYE" requesting an end of the session (T103) and the communication between the transmitter 30A and the recipient 30B is disconnected.

When a negative determination is made at S206 or S208, as a transmission error processing, the transmitter 30A carries out a notification to notify that the connected destination may not a true destination. For example, a warning message, "Destination who responded may be a person spoofing the destination of the designated IP telephone number. The transmission processing of the original document has been stopped", is displayed on the display unit 11 or a message indicating such a fact is printed out from the printer unit 10. Without carrying out the transmission processing of the image data of the original document, a series of the processing operations is ended.

Meanwhile, when the recipient 30B receives "INVITE" (S401: YES), the recipient 30B determines from transmitter information (for example, an IP telephone number) received along with "INVITE", whether or not the received "INVITE" has been transmitted from a transmitter of the first text data received previously by the recipient 30B (from a destination which requested the authentication information) (S402). When a determination is made that "INVITE" has been transmitted from the destination which previously requested the authentication information (S402: YES), the recipient 30B returns the success response code "200 OK" and establishes a media session (S403). Then, the recipient 30B receives image data from the connected transmitter 30A (S404). The received image data is printed out from the printer unit 10 (S405). Meanwhile, when a determination is made at S402 that "INVITE" is not from the destination which previously requested the authentication information (S402: NO), the recipient 30B executes a processing to reject the reception of the image data (S406). For example, without returning the success response code "200 OK" to the received "INVITE", the recipient 30B returns an error code and prevents the media session from being established to reject the reception of the image data.

In the above-described second embodiment, a description is made of an example in which the first text data includes an encrypted authentication information requesting command, and the second text data includes the response text data, the electronic signature and the public key 4f. If the first text data and the second text data are information unique to each facsimile machine 30 and the transmitter 30A can confirm whether or not the recipient 30B is spoofing, the first text data and the second text data are not limited to the above-described example. For example, although there is a difference in the risk of being intercepted, an authentication by an ID and password information can also be carried out. That is, in each facsimile machine 30, an IP telephone number and a password of another facsimile machine 30 can be registered by associating with one another. A command requesting a password can be transmitted as the first text data from the transmitter 30A to the recipient 30B. A password unique to the recipient 30B can be returned to the transmitter 30A as the second text data. Then, when the previously registered password of the recipient 30B corresponds with the returned password, the transmitter 30A determines that the recipient 30B is not spoofing. Only in such a case, the transmitter 30A can transmit image data of an original document to the recipient 30B. In this case, since the password of each facsimile machine 30 is necessary to be notified previously to the destination and registered, the alternative example of the second embodiment can be utilized efficiently in an organization under a certain relationship of trust, for example, in an office using a plurality of facsimile machines 30.

As described above, according to the facsimile machine 30 of the second embodiment of the present invention, the transmitter 30A transmits image data of an original document after confirming that the connected destination is a true destination. Therefore, the transmitter 30A can prevent facsimile data from being received wrongfully by a third party spoofing the destination of the designated IP telephone number.

The invention claimed is:

1. An image communication device, comprising:
   a text data transmitting means for transmitting prescribed first text data to a destination by a method of a call control protocol before establishing a media session by the call control protocol and transmitting image data;
   a text data receiving means for receiving text data from the destination; and
   an image data transmitting means for determining whether the received text data is prescribed second text data and for transmitting the image data to the destination when it is determined that the received text data is prescribed second text data.

2. The image communication device according to claim 1, wherein the prescribed first text data is a command requesting authentication information.

3. The image communication device according to claim 1, wherein an electronic signature is included in the text data received from the destination, and when the electronic signature of the received text data is verified properly.

4. The image communication device according to claim 1, wherein the prescribed first text data is a command requesting a password, and the prescribed second text data is a password.

5. The image communication device according to claim 1, wherein the call control protocol is a Session Initiation Protocol (SIP).

6. The image communication device according to claim 1, wherein the call control protocol is a Session Initiation Protocol (SIP) and the method of the call control protocol is a SIP method "MESSAGE".

* * * * *